(12) United States Patent
Raju et al.

(10) Patent No.: US 12,499,245 B2
(45) Date of Patent: Dec. 16, 2025

(54) METHODS AND APPARATUS FOR SELECTIVE ENCRYPTION OF EXECUTE IN PLACE (XIP) DATA

(71) Applicant: Texas Instruments Incorporated, Dallas, TX (US)

(72) Inventors: Veeramanikandan Raju, Bangalore (IN); Mihir Narendra Mody, Bangalore (IN); Tanu Hari Dixit, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 168 days.

(21) Appl. No.: 18/375,372

(22) Filed: Sep. 29, 2023

(65) Prior Publication Data

US 2025/0111059 A1    Apr. 3, 2025

(51) Int. Cl.
*H04L 9/00* (2022.01)
*G06F 7/58* (2006.01)
*G06F 11/07* (2006.01)
*G06F 21/60* (2013.01)
*G06F 21/72* (2013.01)

(52) U.S. Cl.
CPC ............ *G06F 21/602* (2013.01); *G06F 7/584* (2013.01); *G06F 11/0787* (2013.01); *G06F 21/72* (2013.01)

(58) Field of Classification Search
CPC ..... G06F 21/602; G06F 7/584; G06F 11/0787

USPC .......................................................... 726/26
See application file for complete search history.

(56) References Cited

U.S. PATENT DOCUMENTS

| | | | |
|---|---|---|---|
| 8,271,805 B2* | 9/2012 | Yasue | H04N 21/44055 711/119 |
| 2019/0220349 A1* | 7/2019 | Deutsch | G06F 11/1048 |
| 2022/0027307 A1* | 1/2022 | Chen | G06F 15/7807 |
| 2022/0156411 A1* | 5/2022 | Benoit | G06F 21/79 |
| 2022/0294428 A1* | 9/2022 | Gomm | H03K 5/01 |

OTHER PUBLICATIONS

Texas Instruments, "AM263x LaunchPad User Guide," User Guide SPRUJ10C., dated May 2022, Revised Jan. 2023, 53 pages.

* cited by examiner

*Primary Examiner* — Christopher J Brown
(74) *Attorney, Agent, or Firm* — Michelle F. Murray; Frank D. Cimino

(57) ABSTRACT

An example apparatus includes: interface circuitry; and programmable circuitry configured to: obtain a set of processor instructions; select a first subset of processor instructions from the set; encrypt the first subset of processor instructions; select a second subset of processor instructions from the set; compute a plurality of message authentication codes (MACs) corresponding to the second subset of processor instructions; cause the interface circuitry to write the set of processor instructions to an external memory; and cause the interface circuitry to write a description of the first subset of processor instructions, a description of the second subset of processor instructions, and the plurality of MACs to the external memory.

20 Claims, 10 Drawing Sheets

METHODS AND APPARATUS FOR SELECTIVE ENCRYPTION OF EXECUTE IN PLACE (XIP) DATA

TECHNICAL FIELD

This description relates generally to memory and, more particularly, to methods and apparatus for selective encryption of execute in place (XIP) memory.

BACKGROUND

A System on a Chip (SoC) is an integrated circuit that includes most or all of the resources of a compute device. A SoC may have on-chip resources such as one or more processors, memories, peripheral interfaces, etc. In some examples, the SoC may implement specific functions such as graphics, audio, image processing, etc.

A SOC may have limited memory resources on-chip due to constraints related to size, cost, etc. Therefore, some SoCs may store data in external non-volatile memory using an Execute in Place (XIP) protocol. An XIP protocol allows a processor on the SoC to perform operations using data read directly from external non-volatile memory. The operations occur without having to first transfer the data from the external non-volatile memory to an on-chip memory. With an XIP protocol, data communication between an external non-volatile memory and the on-chip processor does not require intermediate storage to and from an on-chip volatile memory circuit.

SUMMARY

For methods and apparatus for selective encryption of XIP data, an example apparatus includes interface circuitry; and programmable circuitry configured to: obtain a set of processor instructions; select a first subset of processor instructions from the set; perform a plurality of encryption operations to the first subset of processor instructions; select a second subset of processor instructions from the set; compute a plurality of message authentication codes (MACs) corresponding to the second subset of processor instructions; cause the interface circuitry to write the set of processor instructions to an external memory; and cause the interface circuitry to write a description of the plurality of encryption operations and the plurality of MACs to the external memory.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
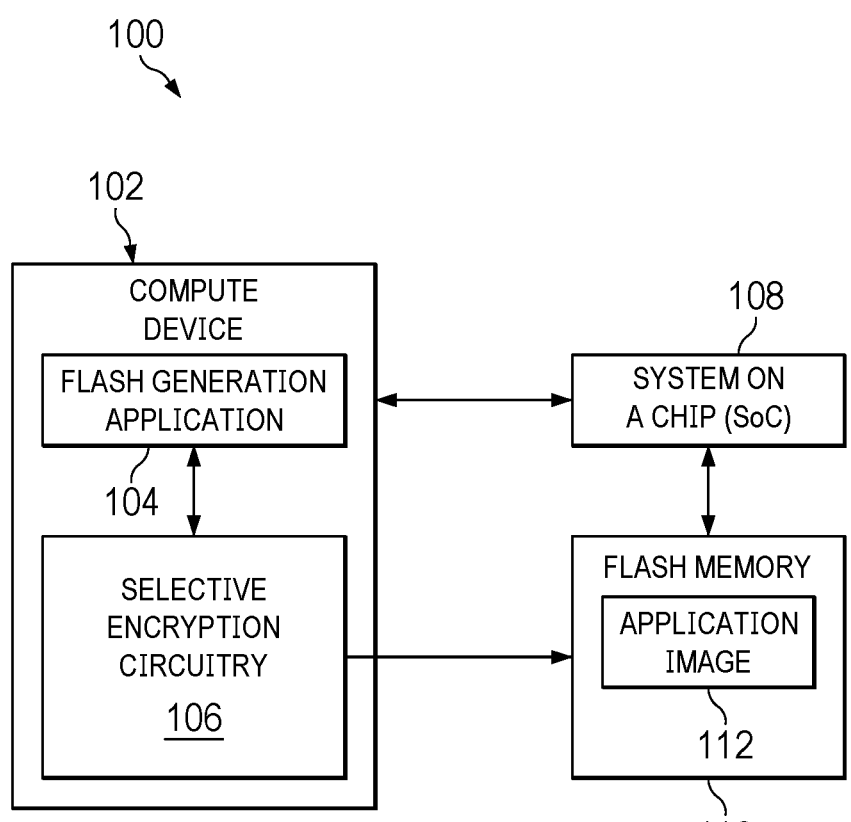
FIG. 1 is a block diagram of an example environment with a host processor, a SoC, and an external memory.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

While the use of external memory does provide SoCs with additional data storage capacity, such a technique relies on a third-party product (e.g., the memory) to store data. The external memory may be referred to as a third-party product because the memory may be designed and/or manufactured from the SoCs that read and write the data. In many examples, industry members seek to secure data before storing it on an external memory to protect against exposure to accidental errors or malicious actors.

As used herein, security of data refers to both encryption and authentication. Encryption converts data into an uninterpretable format (e.g., a code). Encrypted data cannot be interpreted until it has been reconverted into its original format (e.g., decrypted). Authentication verifies that data accessed from an external memory matches an expected value. Encryption and authentication are discussed further below in connection with FIGS. 5-9.

Some devices encrypt and authenticate every block of data that will be read from an external memory. Such a technique may require additional header data to store the results of authentication and/or encryption operations, thereby reducing throughput. For example, in a 32-byte block of data stored in external flash, up to 16 bytes may be used to store a Message Authentication Code (MAC) that authenticates the remaining 16 bytes of information. Encrypting and authenticating every block of data can also lead to throughput loss. For example, suppose a read operation of 32 bytes from external memory requires approximately 450 nanoseconds (ns) without any security operations. A read of the same 32 bytes of data from the same external memory may require approximately 600 ns if decryption and authentication operations were utilized.

Accordingly, SoCs that encrypt and authenticate every block of data sent to external memory may suffer performance losses to achieve such security.

Example methods, apparatus, and systems herein increase the performance of memory operations by selectively securing data read from and/or written to external memory. Example selective encryption circuitry determines whether to encrypt a given block of XIP data (e.g., processor instructions) based on a predefined sequence, the information stored in the data, and/or a pseudorandom algorithm. The example selective encryption circuitry also determines whether to authenticate a given block of XIP data based on a predefined sequence, the information stored in the data, and/or a pseudorandom algorithm. The example selective encryption circuitry encodes a description of the two independently formed subsets (e.g., a first subset of encrypted XIP data and a second subset of authenticated XIP data) into a comparatively small header stored in flash memory. Within a SoC, an example FSS uses the header to only decrypt or authenticate a subset of the XIP data. As a result, the access of the XIP data by the example FSS has increased throughput and decreased latency when compared to applications that encrypt and authenticate every block of data sent to external memory.

The example FSS logs errors, in real time, that are caused when a processor core on the SoC performs operations using the XIP data. The example FSS may perform corrective actions based on the error code itself, or perform corrective actions based on a comparison between a MAC stored in flash memory and a MAC computed on a SoC. Advantageously, the real time updates of an error log and subsequent check for corrective action mitigates security vulnerabilities raised by the selective encryption and authentication of XIP data.

FIG. 1 is a block of an example environment with a host processor, a SoC, and an external memory. The example environment 100 of FIG. 1 includes a compute device 102 that implements an example flash generation application 104 and example selective encryption circuitry 106. FIG. 1 also includes an example System on a Chip (SoC) 108 and example flash memory 110. The flash memory 110 stores an application image 112. The environment 100 may include additional components not illustrated in the example of FIG. 1.

The compute device 102 refers to a device that executes applications and coordinates operations between the other components of the environment 100. The compute device 102 may be implemented by devices including but not limited to a laptop, a mobile device, a server, etc. The compute device 102 includes programmable circuitry to execute applications and coordinate operations. Examples of programmable circuitry include but are not limited to programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs).

Within the compute device 102, the flash generation application 104 refers to a program that generates an application image. In examples described herein, the application image contains one or more portions of XIP data that may include processor instructions, configuration parameters, and/or other data used to execute a program. The application image may be referred to as static because the data (e.g., the code) used to implement the flash generation application 104 is not regularly amended or replaced. In some examples, the application image is a boot image. A boot image refers to a computer file that allows some or all of the SoC 108 to boot (e.g., deploy an operating system, enter a standby mode, etc.). In other examples, the application image is a different type of static data.

Within the compute device 102, the selective encryption circuitry 106 receives the application image from the flash generation application 104. The selective encryption circuitry 106 then encrypts and authenticates various portions of the internal XIP data in accordance with the teachings of this disclosure. The selective encryption circuitry 106 stores the resulting application image 112 in the flash memory 110.

The SoC 108 reads the application image 112 from the flash memory 110 to enable the operations of one or more components. To read the application image 112, the SoC 108 selectively decrypts and selectively authenticates portions of the application image 112 in accordance with the teachings of this disclosure.

The SoC 108 may be implemented with a different type of programmable circuitry than the compute device 102 and/or include different hardware components than the compute device 102. As a result, the SoC 108 may execute instructions and/or perform some operations more efficiently than the compute device 102. In some examples, the SoC 108 performs operations based on instructions within the application image 112.

The flash memory 110 is an example implementation of nonvolatile memory that is external to both the compute device 102 and the SoC 108. In some examples, the environment 100 implements a different type of external nonvolatile memory. The flash memory 110 stores data used by other components of the environment 100 to perform operations. Data stored in the flash memory 110 includes but is not limited to the application image 112.

Advantageously, the selective encryption and the selective authentication of the selective encryption circuitry 106 increases the throughput of information stored in the flash memory 110 and decreases the latency required for the SoC 108 to read the application image 112. Furthermore, the SoC 108 implements a tampering detection algorithm in accordance with the teachings of the disclosure. The tampering detection detects any tampering (e.g., editing) that may have occurred to an unsecured XIP data portion while stored in the third-party flash memory 110. As a result, the example environment maintains a similar level of security while improving performance when compared to an application that would encrypt and authenticate every block of data sent to external memory.

Figure 2:
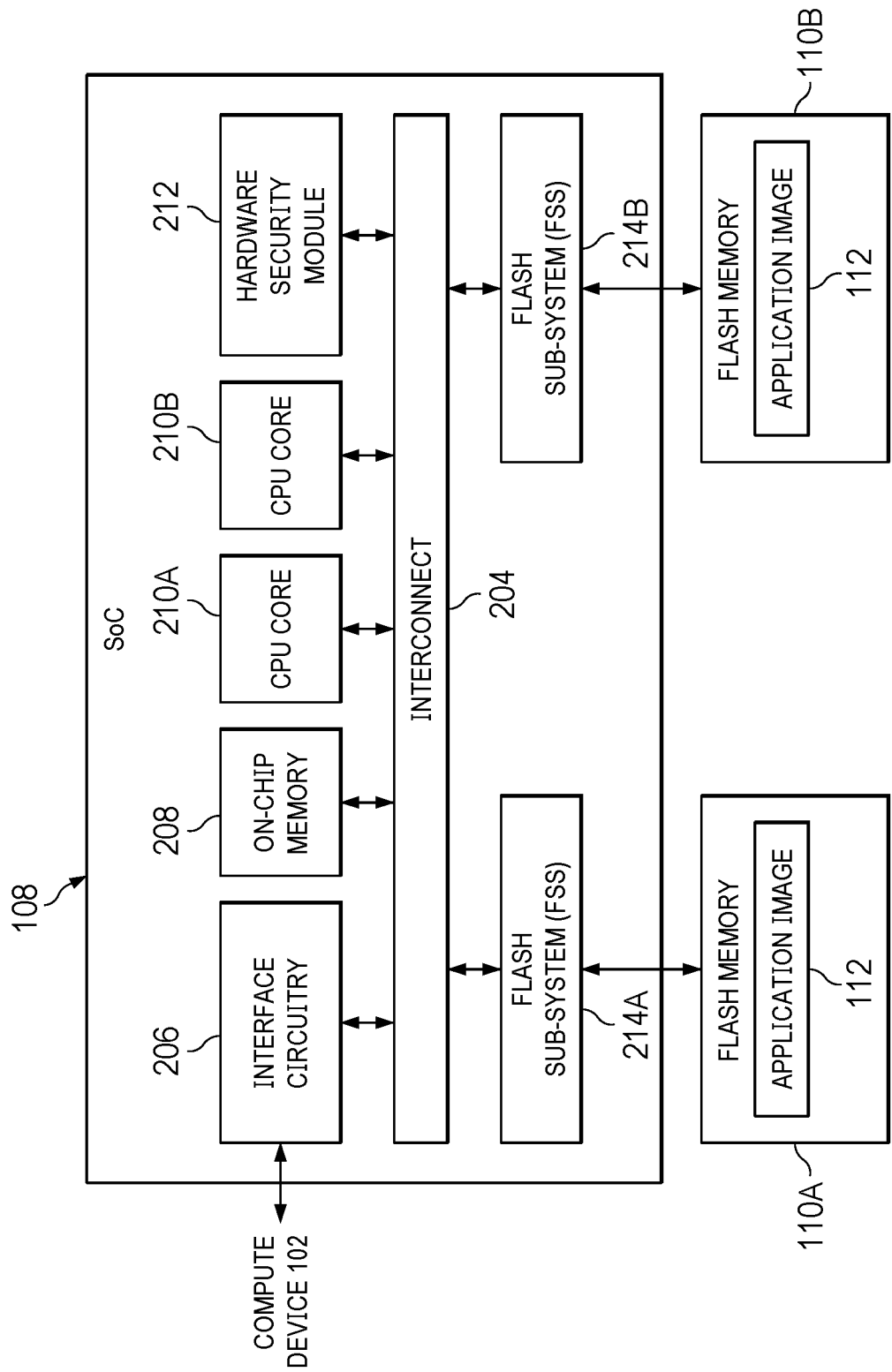
FIG. 2 is a block diagram of an example implementation of the SoC of FIG. 1.

FIG. 2 is a block diagram of an example implementation of the SoC 108 of FIG. 1. The SoC 108 may be instantiated (e.g., creating an instance of, bring into being for any length of time, materialize, implement, etc.) by programmable circuitry such as a Central Processor Unit (CPU) executing first instructions. Additionally or alternatively, the SoC 108 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers. FIG. 2 includes the selective encryption circuitry 106, flash memory 110A and 110B, and the SoC 108. The SoC 108 includes an interconnect 204, interface circuitry 206, on-chip memory 208, CPU cores 210A and 210B a hardware security module (HSM) 212, and Flash Sub-System (FSS) 214A and FSS 214B (referred to collectively as FSS instances 214).

The flash memory 110 may be implemented by any number of individual memory modules. For example, in FIG. 2, the flash memory 110A and 110B are both implementations of the flash memory 110. In the example, the flash memory 110A is used exclusively by the SoC 108, while the flash memory 110B may be a shared resource used amongst any number of components within the environment 100.

The interconnect 204 is a communication system used to exchange data between the components of the SoC 108. The example interconnect 204 may be implemented using any communication system that meets pre-determined threshold power and latency requirements. In some examples, the example interconnect 204 may implement communication protocols that include, but are not limited to, Open Core Protocol (OCP), Advanced Extensible Interface (AXI), etc.

The interface circuitry 206 sends and receives data from components within the environment 100 other than the flash memory 110 (e.g., the compute device 102). In the example of FIG. 1, the compute device 102 uses a direct connection to the flash memory 110 to store the application image 112. In other examples, the compute device 102 may use a direct connection to the interface circuitry 206 (and more generally, the SoC 108) as an alternate path to write the application image 112. The interface circuitry 206 may include transceivers, antennas, and/or other hardware components required to send and receive data within the environment 100.

The on-chip memory 208 stores data by the other components of the SoC 108 to perform operations. For example, if the application image 112 contains portions that are not XIP supported, the SoC 108 transfers the non-XIP data from the flash memory 110A and/or 110B to the on-chip memory 208. One or both of the CPU cores 210A and 210B then access the on-chip memory 208 to perform operations using the non-XIP data. The on-chip memory 208 may store other types of data in addition to non-XIP portions of the application image 112.

The on-chip memory 208 may be composed of any type of volatile and/or non-volatile memory. The on-chip memory 208 may be limited in storage capacity due to the cost and space savings described above, thereby causing the SoC 108 to store data in external locations (e.g., the flash memory 110A and 110B).

The CPU cores 210A and 210B execute instructions and/or perform operations using data read from the application image 112. For example, if the application image 112 is a boot image, one or both of the CPU cores 210A and 210B may start a component of the SoC 108 by performing operations using data from the boot image. The booted component may be a hardware module or a software program. In some examples, the CPU core 210A and CPU core 210B perform different operations using different portions of the application image 112.

The example block diagram of FIG. 2 shows two instances of the CPU cores 210A and 210B. In practice, the SoC 108 may include any number of CPU cores. The SoC 108 may additionally or alternatively include other types of programmable circuitry that executes instructions and/or performs operations using the application image 112.

The HSM 212 performs security operations for the non-XIP portions of the application image 112. In some examples, the selective encryption circuitry 106 of FIG. 1 encrypts and authenticates non-XIP data to be stored in the flash memory 110A or 110B by default. After the non-XIP data is transferred to the on-chip memory 208, the HSM 212 performs decryption and authentication of the non-XIP data. As such, the CPU cores 210A and 210B can trust the non-XIP data is interpretable and trust the non-XIP data was not edited during storage within the third-party flash memory.

The HSM 212 also performs tamper detection in accordance with the teachings of this disclosure. During tamper detection, the HSM 212 determines whether an error experienced by the CPU cores 210A or 210B was caused by the editing of data stored in the third-party flash memory 110A. Tamper detection is discussed further in connection with FIGS. 8 and 9.

The FSS 214A and FSS 214B operate as an interface between the SoC 108 and the flash memory 110A and 110B, respectively. The example of FIG. 2 shows two FSS instances 214A and 214B. In other examples, the SoC 108 includes any number of FSS instances 214.

The FSS instances 214 transfer non-XIP portions of the application image 112 to the on-chip memory 208 via the interconnect 204. The FSS instances 214 also provide XIP portions of the application image 112 directly to the CPU cores 210A or 210B for processing. Before providing a given XIP portion to the CPU cores 210A or 210B, FSS instances 214 may selectively decrypt and/or authenticate the XIP portion in accordance with the teachings of this disclosure. The FSS instances 214 also implement tamper detection algorithms in accordance with the teachings of this disclosure to mitigate against unencrypted or un-authenticated XIP data being used as an attack surface. The FSS instances 214 are discussed further in connection with FIG. 3. In some examples, the FSS instances 214 are instantiated by programmable circuitry executing FSS instructions and/or configured to perform operations such as those represented by the flowchart(s) of FIGS. 5-9. In some examples, the FSS instances 214 are referred to as accelerators.

Figure 3:
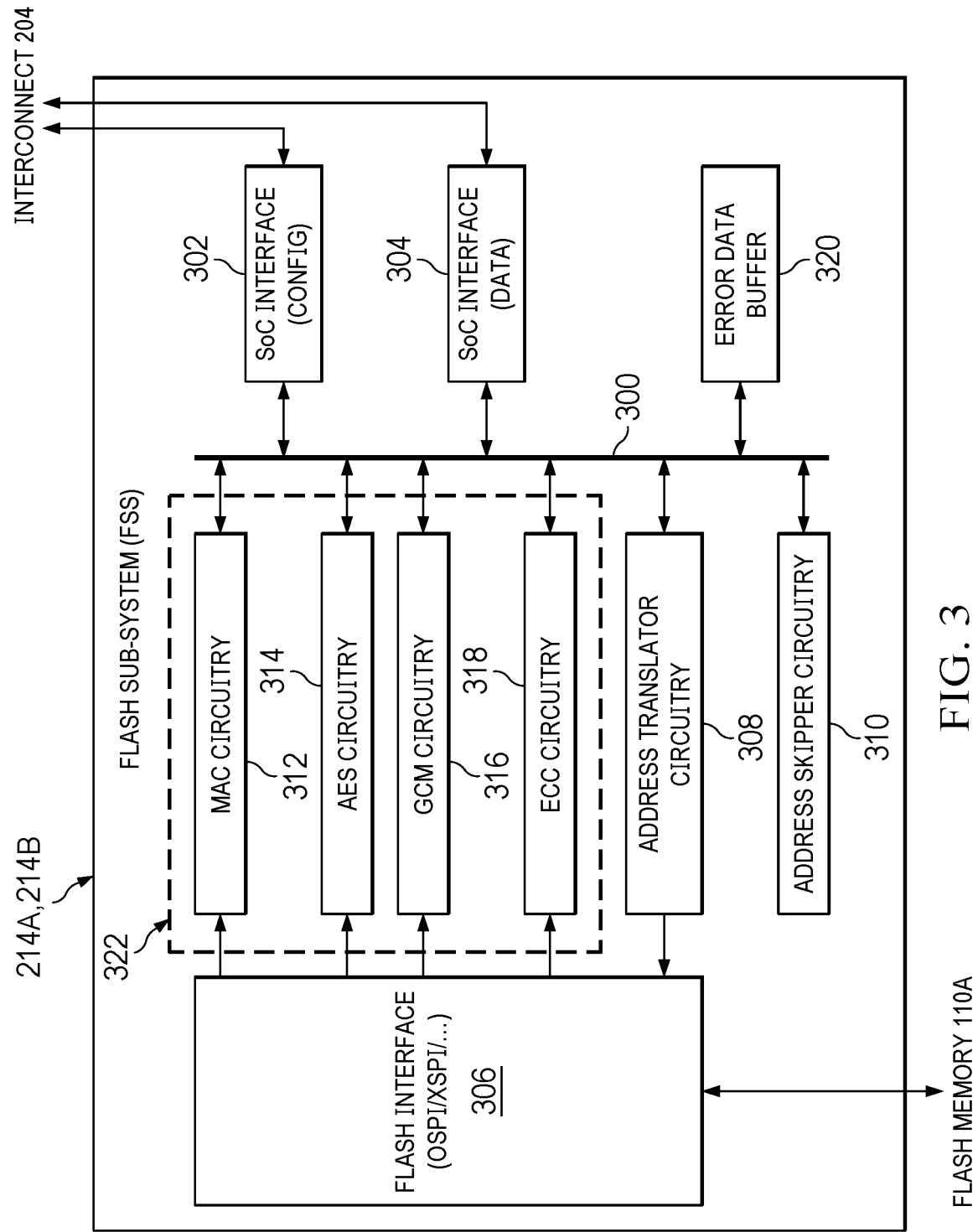
FIG. 3 is a block diagram of an example implementation of the flash sub-system (FSS) of FIG. 2.

FIG. 3 is a block diagram of an example implementation of the FSS instances 214 of FIG. 2. FIG. 3 includes the interconnect 204, FSS 214A, and the flash memory 110A. The example FSS 214A includes the bus 300, configuration interface circuitry 302, data interface circuitry 304, flash interface circuitry 306, address translator circuitry 308, address skipper circuitry 310, MAC circuitry 312, Advanced Encryption Standard (AES) circuitry 314, Galois/Counter Mode (GCM) circuitry 316, Error Correction Code (ECC) circuitry 318, and an error data buffer 320. The MAC circuitry 312, AES circuitry 314, GCM circuitry 316, and ECC circuitry 318 may collectively be referred to as flash security circuitry 322. While the following description of FIG. 3 is made in reference to FSS 214A, any of the FSS instances 214 may be implemented according to the example block diagram of FIG. 3.

The bus 300 refers to one or more physical connections (e.g., an interconnect, copper trace, etc.) that enables communication between internal components of the FSS 214A. The bus 300 may be implemented using one or more communication systems that meet pre-determined threshold power and latency requirements.

The configuration interface circuitry 302 sends and receives configuration parameters from the CPU core 210A, the CPU core 210B or the HSM 212 of FIG. 2 via the interconnect 204. The configuration parameters may refer to any data that enables the FSS 214A to function in a specific manner. For example, the configuration interface circuitry 302 may receive cryptographic keys used by the AES circuitry 314 and/or GCM circuitry 316. The configuration interface circuitry 302 may employ any suitable communication protocol to enable the exchange of configuration parameters.

The configuration interface circuitry 302 may additionally receive data that instructs the FSS 214A to read XIP data from the flash memory 110A in a particular mode. For example, the FSS 214A may operate in: (a) a first mode in which some XIP data portions are selectively decrypted and some XIP data portions are selectively authenticated, (b) a second mode in which every XIP data portion is decrypted and some XIP data portions are selectively authenticated, (c) a third mode in which some XIP data portions are decrypted and every XIP data portion is authenticated, or (d) a fourth mode in which every XIP data portion is decrypted and every XIP data portion is authenticated. The FSS 214A mode of operation may be determined by the flash generation application 104 of FIG. 1 and be based on the application image 112.

The data interface circuitry 304 sends and receives data with other components in the SoC 108. For example, the data interface circuitry 304 provides XIP data directly to the CPU cores 210A and 210B via the interconnect 204. The data interface circuitry 304 also stores non-XIP data in the on-chip memory 208 via the interconnect 204. The data interface circuitry 304 may employ any suitable communication protocol to enable the transfer of data.

The flash interface circuitry 306 writes data to and reads data from the external flash memory 110A. The flash interface circuitry 306 may include transceivers, antennas, and/or other hardware components required to read and write data with the flash memory 110A. The flash interface circuitry 306 also implements any suitable communication protocol to enable such communication. Examples of communication protocols that may be implemented flash interface circuitry 306 include but are not limited to Octal Serial Peripheral Interface (OSPI), Expanded Serial Peripheral Interface (XSPI), etc.

The address translator circuitry 308 provides the flash interface circuitry 306 with one or more addresses within the flash memory 110A and may perform address translation from an address space of a requestor (e.g., CPU core 210A or 210B) to an address space of the flash memory 110A. The address translator circuitry 308 also instructs the flash interface circuitry 306 to perform either a read operation or a write operation at each of the provided address. In some examples, the address translator circuitry 308 receives an operation from a requestor and, in response, provides an address of the flash memory 110A, an instruction to perform a write operation, and a corresponding value for storage at the provided address.

The address skipper circuitry 310 obtains a copy of the instructions provided by the address translator circuitry 308 to the flash interface circuitry 306. When the instructions refer to a read operation, the address skipper circuitry 310 informs the flash security circuitry 322 whether to perform a security operation or skip processing of the reading. For example, if the read operation obtains non-XIP data from the flash memory 110A, the address skipper circuitry 310 may inform the flash security circuitry 322 to skip performance of some or all supported security operations. Security operations may be skipped within the FSS 214A in such examples because the HSM 212 of FIG. 2 is responsible for the security of non-XIP data.

Alternatively, if a read operation by the flash interface circuitry 306 obtains XIP data from the flash memory 110A, the address skipper circuitry 310 may selectively inform one or more components of the flash security circuitry 322 to perform security operations in accordance with the teachings of this disclosure. For example, the address skipper circuitry 310 may cause a first XIP portion to be decrypted but not authenticated. The address skipper circuitry 310 may then cause a subsequent XIP portion to be authenticated but not decrypted. As used above and herein, the choice to not decrypt or not authenticate a given portion of XIP data may be referred to as skipping security operations. The address skipper circuitry 310 is discussed further in connection with FIG. 8.

Within the flash security circuitry 322, the MAC circuitry 312 authenticates data when instructed to do so by the address skipper circuitry 310. To authenticate data, the MAC circuitry 312 executes an authentication algorithm using a portion of data (e.g., a message) read from the flash memory 110A. The output of the authentication algorithm is a specific value. In some examples, the value is referred to as a tag or a MAC. The MAC circuitry 312 compares the MAC generated in the FSS 214A to a MAC that was stored in the flash memory 110A and generated by the selective encryption circuitry 106 of FIG. 1. If the values of the two MACs match, the MAC circuitry 312 can confirm that the message was not edited during storage in the third-party flash memory 110A. In some examples, confirming that data was not edited while stored in external memory is referred to as authenticating the data.

Within the flash security circuitry 322, the ECC circuitry 318 selectively uses ECCs to check for errors within a chunk of XIP data. An ECC refers to a number of bits, generally at the end of the chunk, which describe the message in the XIP data. Types of ECC include but are not limited to block codes, convolutional codes, etc. If instructed by the address skipper circuitry 310, the ECC circuitry 318 executes an algorithm that uses an ECC to detect errors in the corresponding chunk of XIP data. In some examples, the algorithm used by the ECC circuitry 318 is based on the type of ECC stored in the application image 112.

Within the flash security circuitry 322, the AES circuitry 314 and the GCM circuitry 316 each perform a type of decryption when instructed to do so by the address skipper circuitry 310. For example, the AES circuitry 314 uses a symmetric block cipher to decrypt data with a government defined format. The GCM circuitry 316 performs description using GCM, a particular mode of operation within the AES standard. GCM balances security and performance differently than other AES modes of operation (e.g., cipher block chaining (CBC)). In some examples, the decryption performed by the AES circuitry 314 and the GCM circuitry 316 are referred to as on-the-fly (OTF) decryption because the operations happen in real time as values are read from the flash memory 110A (as opposed to reading the entire application image 112 from memory before beginning to decrypt the data).

The FSS 214A may read an XIP portion of data from the flash memory 110A and provide the XIP portion directly to the CPU cores 210A or 210B without decryption and/or authentication from the flash security circuitry 322. In some examples, the CPU cores 210A or 210B may generate an error when performing operations using the insecure/less secure XIP data. Similarly, the flash interface circuitry 306 may generate an error when reading XIP data. If selected to perform operations, the ECC circuitry 318 may also report an error when checking an ECC that corresponds to XIP data.

If an error occurs, the FSS 214A stores information relevant to the error in the error data buffer 320. Such information may include but is not limited to error codes generated by the CPU core 210, some or all of the XIP data that was used during the error, the address of the flash memory 110A in which said XIP data was stored, etc. The HSM 212 of FIG. 2 uses the error data buffer 320 to determine whether the error was caused by the editing of data stored in the third-party flash memory 110A.

By informing the flash security circuitry 322 to skip decryption and/or authentication on some XIP portions of data, the address skipper circuitry 310 decreases the amount of time required before the CPU cores 210A or 210B can use the XIP data. Furthermore, the selective encryption circuitry 106 of FIG. 1 requires less data (e.g., fewer MACs, fewer encryption keys, etc.) to describe XIP portions that skip security operations than XIP portions that require security operations. Accordingly, by selectively encrypting/decrypting and selectively authenticating only some XIP data, the selective encryption circuitry 106 and address skipper circuitry 310 enable improved performance of the SoC 108 compared to a system that encrypts and authenticates all XIP data. Advantageously, any potential attack surface that results from fewer security operations is mitigated by the tamper detection performed by both the FSS 214A and the HSM 212 using the error data buffer 320. Accordingly, an application that implements the teachings of this disclosure may experience better performance and similar security to an application that encrypts and authenticates all XIP data.

Figure 4:
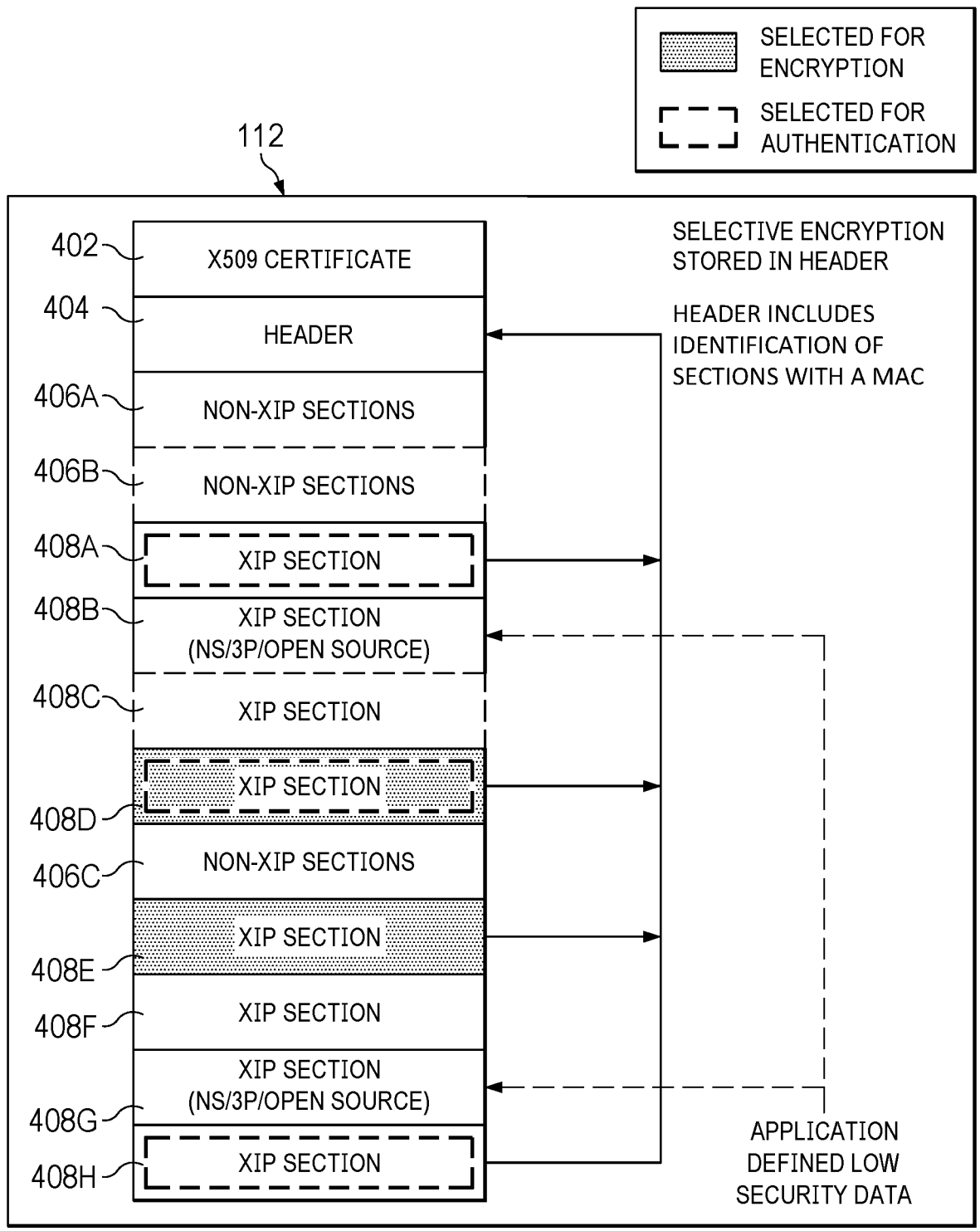
FIG. 4 is an illustrative example of an application image stored in the flash memory of FIG. 1.

FIG. 4 is an illustrative example of the application image 112 stored in the flash memory 110 of FIG. 1. In the example of FIG. 4, the application image 112 includes a certificate section 402, a header section 404, non-XIP data sections 406A, 406B, and 406C (collectively referred to as non-XIP data sections 406), and XIP data sections 408A, 408B, 408C, 408D, 408E, 408F, and 408G (collectively referred to as XIP data sections 408). In some examples the XIP data sections 408 are referred to as XIP data portions, XIP pages, chunks of XIP data, etc.

The certificate section 402 identifies an entity (e.g., a user, computer, company, etc.) and contains data used to verify that the data described by the certificate originates with the identified entity. In the example of FIG. 4, the certificate section 402 is formatted using the X.509 standard. In other examples, the certificate section may be organized in a different format.

The header section 404 describes the security operations performed on the remaining sections of the application image 112. For instance, the header section 404 indicates which XIP data sections 408 are encrypted and which XIP data sections 408 are authenticated (e.g., which XIP data sections include a MAC and/or ECC). In some examples, the header section does not explicitly refer to the security of the non-XIP data sections 406 because each of the non-XIP data sections 406 are encrypted and authenticated by default. The header section 404 also includes an overall MAC that was generated using all of the XIP data sections 408 as an input.

The header section 404 describes how the selective encryption circuitry 106 selectively encrypted and selectively authenticated the set of XIP data sections 408. In some applications, the set of XIP data sections 408 that are encrypted may be independent of the set of XIP data sections 408 that are authenticated. For example, in FIG. 4, the selective encryption circuitry 106 encrypted XIP data sections 408D, and 408E. The selective encryption circuitry 106 also authenticated XIP data sections 408A, 408D, and 408H. When the flash interface circuitry 306 reads the application image 112 from the flash memory 110, the address skipper circuitry 310 uses the header section 404 to determine that the flash security circuitry 322 can: (a) skip decryption for XIP data sections 408A, 408B, 408C, 408F, 408G, and 408H, and (b) skip authentication for XIP data sections 408B, 408C, 408E, 408F, 408G.

The selective encryption circuitry 106 may determine which XIP data sections 408 to selectively encrypt and/or authenticate using a variety of techniques. In the example of FIG. 4, the flash generation application 104 informs the selective encryption circuitry 106 that XIP data sections 408B, 408G contain low security data. The flash generation application 104 may define one or more sections as low security for any reason. For example, some portions of an application image may contain propriety code that is more confidential than other sections that contain open-source code. Accordingly, the selective encryption circuitry 106 may forego encryption and authentication of open-source code, thereby improving performance while still securing the sensitive portions of the application image 112. The low security data of XIP data sections 408B, 408G may be additionally or alternatively referred to as not secure (NS) data or third party (3P) data.

In addition to whether a section of code is confidential or open-source, the selective encryption circuitry 106 may employ other techniques along with or instead of the header 404 to determine which XIP data sections 408 to selectively encrypt and/or authenticate. Such additional techniques include but are not limited to a pre-defined sequence and a pseudorandom algorithm. Techniques for selecting XIP data sections 408 for encryption and/or authentication are discussed further in connection with FIGS. 5-7.

While an example manner of implementing the SoC 108 of FIG. 1 is illustrated in FIGS. 2 and 3, one or more of the elements, processes, and/or devices illustrated in FIGS. 2 and 3 may be combined, divided, re-arranged, omitted, eliminated, and/or implemented in any other way. Further, the selective encryption circuitry 106, the interconnect 204, the interface circuitry 206, the on-chip memory 208, the CPU core 210, the HSM 212, the FSS instances 214, the bus 300, the configuration interface circuitry 302, the data interface circuitry 304, the flash interface circuitry 306, the address translator circuitry 308, the address skipper circuitry 310, the MAC circuitry 312, the AES circuitry 314, the GCM circuitry 316, the ECC circuitry 318, the error data buffer 320, and/or, more generally, the example compute device 102 and SoC 108 of FIG. 1, may be implemented by hardware alone or by hardware in combination with software and/or firmware. Thus, for example, any of the selective encryption circuitry 106, the interconnect 204, the interface circuitry 206, the on-chip memory 208, the CPU core 210, the HSM 212, the FSS instances 214, the bus 300, the configuration interface circuitry 302, the data interface circuitry 304, the flash interface circuitry 306, the address translator circuitry 308, the address skipper circuitry 310, the MAC circuitry 312, the AES circuitry 314, the GCM circuitry 316, the ECC circuitry 318, the error data buffer 320, and/or, more generally, the example compute device 102 and SoC 108 of FIG. 1, could be implemented by programmable circuitry in combination with machine readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s)), ASIC(s), programmable logic device (s) (PLD(s)), and/or field programmable logic device(s) (FPLD(s)) such as FPGAs. Further still, the example SoC 108 of FIG. 1 may include one or more elements, processes, and/or devices in addition to, or instead of, those illustrated in FIG. 2, and/or may include more than one of any or all of the illustrated elements, processes and devices.

Flowchart(s) representative of example machine readable instructions, which may be executed by programmable circuitry to implement and/or instantiate the selective encryption circuitry 106 and SoC 108 of FIG. 1 and/or representative of example operations which may be performed by programmable circuitry to implement and/or instantiate the selective encryption circuitry 106 and SoC 108 of FIG. 1, are shown in FIGS. 5-9. The machine readable instructions may be one or more executable programs or portion(s) of one or more executable programs for execution by programmable circuitry such as the programmable circuitry 1012 shown in the example programmable circuitry platform 1000 described below in connection with FIG. 10 and/or may be one or more function(s) or portion(s) of functions to be performed by the example programmable circuitry (e.g., an FPGA). In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, read only memory (ROM), a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 5-9, many other methods of implementing the example selective encryption circuitry 106 and SoC 108 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc.

For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-9 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 5:
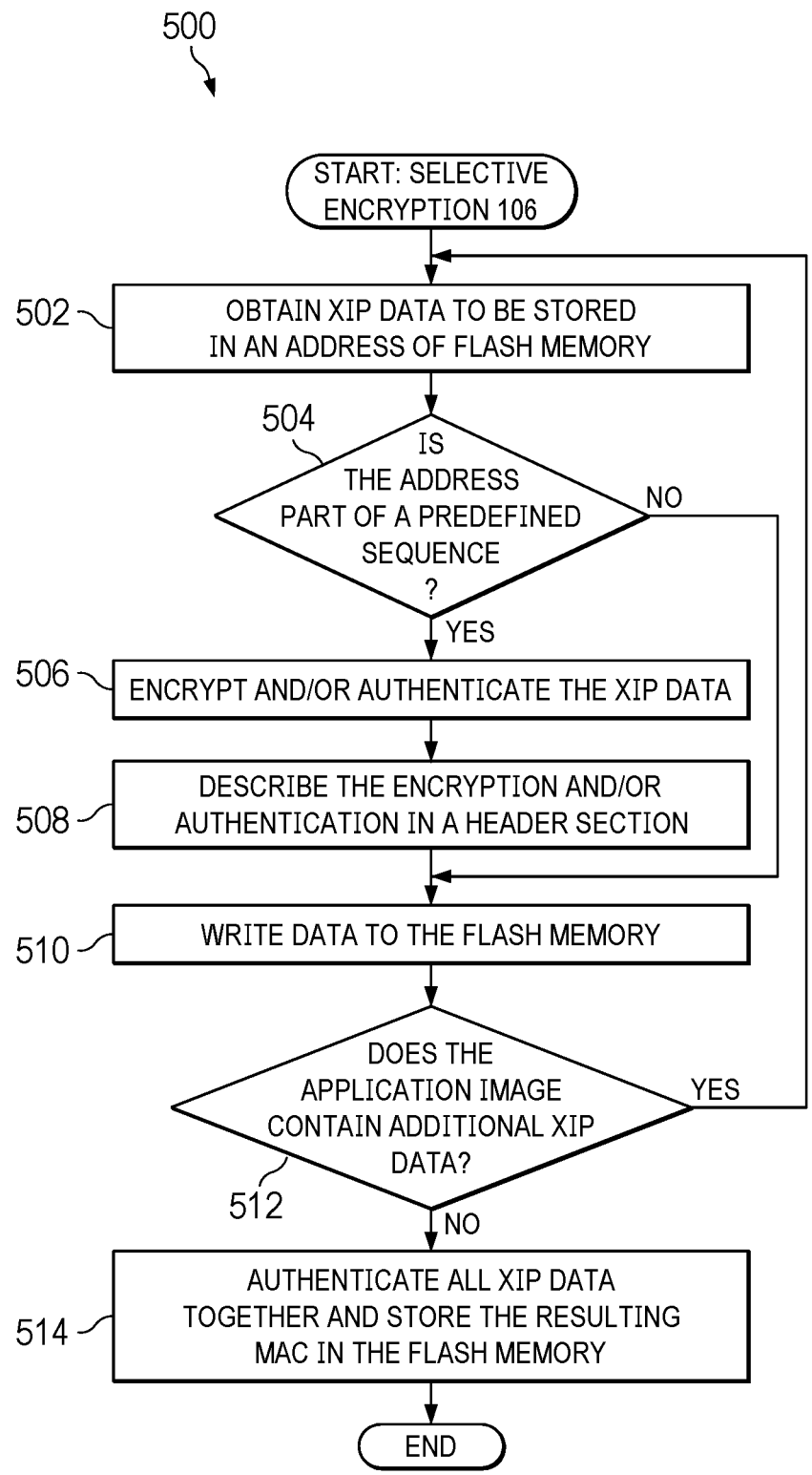
FIG. 5 is a first flowchart representative of example machine readable instructions and/or example operations that may be executed, instantiated, and/or performed using an example programmable circuitry to implement the selective encryption circuitry of FIG. 1.

FIG. 5 is a first flowchart representative of example machine readable instructions and/or example operations 500 that may be executed, instantiated, and/or performed by programmable circuitry to implement the selective encryption circuitry 106 of FIG. 1. The example machine-readable instructions and/or the example operations 500 of FIG. 5 begin when the example selective encryption circuitry 106 obtains XIP data to be stored in an address of the flash memory 110. (Block 502). In examples described herein, the XIP data is part of the application image 112 and is provided by the flash generation application 104. In other examples, the XIP data refers to a different type of data provided by a different program implemented on the compute device 102. In some examples, the selective encryption circuitry 106 receives a portion of XIP data to be stored across multiple adjacent addresses of the flash memory 110. The portion of XIP data may also be referred to as a chunk or a block of XIP data.

The selective encryption circuitry 106 determines whether the address is part of a pre-defined sequence. (Block 504). The pre-defined sequence may refer to any type of pattern that the selective encryption circuitry 106 uses to decide which portions of XIP should be selected for encryption and/or authentication. For example, the pre-defined sequence may indicate that x in every y XIP portions will be selected, where x and y refer to any positive integer. In other examples, the pre-defined sequence is a different type of deterministic pattern.

If the address is not part of the pre-defined sequence (Block 504: No), control proceeds to block 510. If the address is part of the pre-defined sequence (Block 504: Yes), the selective encryption circuitry 106 encrypts and/or generates authentication data (e.g., a MAC) for the XIP data. (Block 506). In some examples, the selective encryption circuitry 106 uses the same pre-defined sequence to select data for encryption and to select data for authentication. In other examples, the selection of data for encryption is unrelated to the selection of data for authentication.

The selective encryption circuitry 106 describes the encryption and/or the authentication of block 506 in the header section 404 of FIG. 4. (Block 508). The description of the encryption and/or the authentication may be in any suitable format. In some examples, each bit stored at an address of the header section represents a portion (e.g., a set number of bytes) of XIP data. A bit with a logical value of 0 may indicate the corresponding XIP portion is not encrypted, while a bit with a logical value of 1 may indicate the corresponding XIP portion is encrypted. In some examples, the operations of block 508 are referred to as encoding.

The selective encryption circuitry 106 writes the XIP data of block 502 with any encryption or authentication data that results from block 506 to the flash memory 110. (Block 510). The selective encryption circuitry 106 may use any suitable communication protocol to write the XIP data. In some examples, the selective encryption circuitry 106 also writes the header section of block 508 to memory at block 510.

The selective encryption circuitry 106 determines whether the application image 112 contains additional XIP data. (Block 512). In some examples, the selective encryption circuitry 106 communicates with the flash generation application 104 to make the determination of block 512. In some examples, a different type of data is stored in flash memory 110 instead of the application image 112. In such examples, the selective encryption circuitry 106 communicates with the source of the different type of data (e.g., a different program running on the compute device 102) to make the determination of block 512. If the flash generation application 104 does have additional XIP data (Block 512: Yes), control returns to block 502 where the selective encryption circuitry 106 obtains the additional XIP data.

If the flash generation application 104 does not have additional XIP data (Block 512: No), the selective encryption circuitry 106 authenticates all XIP portions together. (Block 514). That is, the selective encryption circuitry 106 executes an authentication algorithm that uses every portion of XIP data obtained at block 502 as an input. The authentication algorithm produces a MAC, which the selective encryption circuitry 106 also writes to the flash memory 110 in block 514. The machine-readable instructions and/or operations 500 end after block 514.

Figure 6:
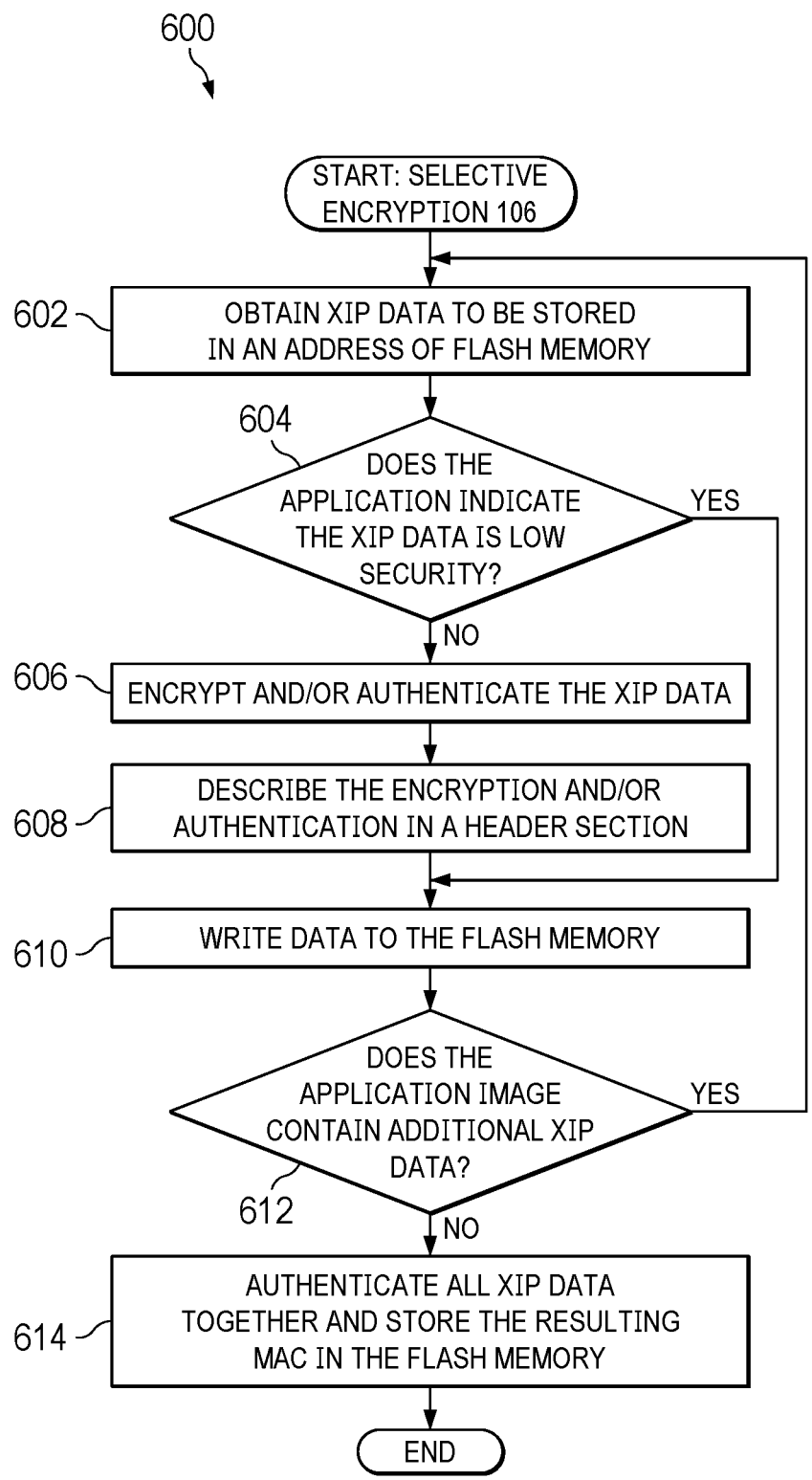
FIG. 6 is a second flowchart representative of example machine readable instructions and/or example operations that may be executed, instantiated, and/or performed using an example programmable circuitry to implement the selective encryption circuitry of FIG. 1.

FIG. 6 is a second flowchart representative of example machine readable instructions and/or example operations 600 that may be executed, instantiated, and/or performed by programmable circuitry to implement the selective encryption circuitry of FIG. 1. The example machine-readable instructions and/or the example operations 600 of FIG. 6 begin when the example selective encryption circuitry 106 obtains XIP data to be stored in an address of the flash memory 110. (Block 602). The XIP data may refer to any type of data and any amount of data, as described above in connection with block 502 of FIG. 5.

The selective encryption circuitry 106 determines whether the flash generation application 104 indicates the XIP data is low security. (Block 604). The flash generation application 104 may indicate data is low security for any reason, including but not limited to the data corresponding to open-source licensed code as described above. In some examples, the flash generation application 104 categorizes the XIP data differently (e.g., refers to the data as low priority). When implementing block 604 in such examples, the selective encryption circuitry 106 determines whether to encrypt and/or authenticate the XIP data based on said categorization.

If the application indicates the XIP data is low security (Block 604: Yes), control proceeds to block 610. Alternatively, if the application indicates the XIP data is privileged, confidential, or generally not labelled as low security (Block 604: No), the selective encryption circuitry 106 encrypts and/or authenticates the XIP data. (Block 606). The selective encryption circuitry 106 then implements blocks 608, 610, 612, and 614 using the same operations described above in connection with blocks 508-514 of FIG. 5. The machine-readable instructions and/or operations 600 end after block 614.

Figure 7:
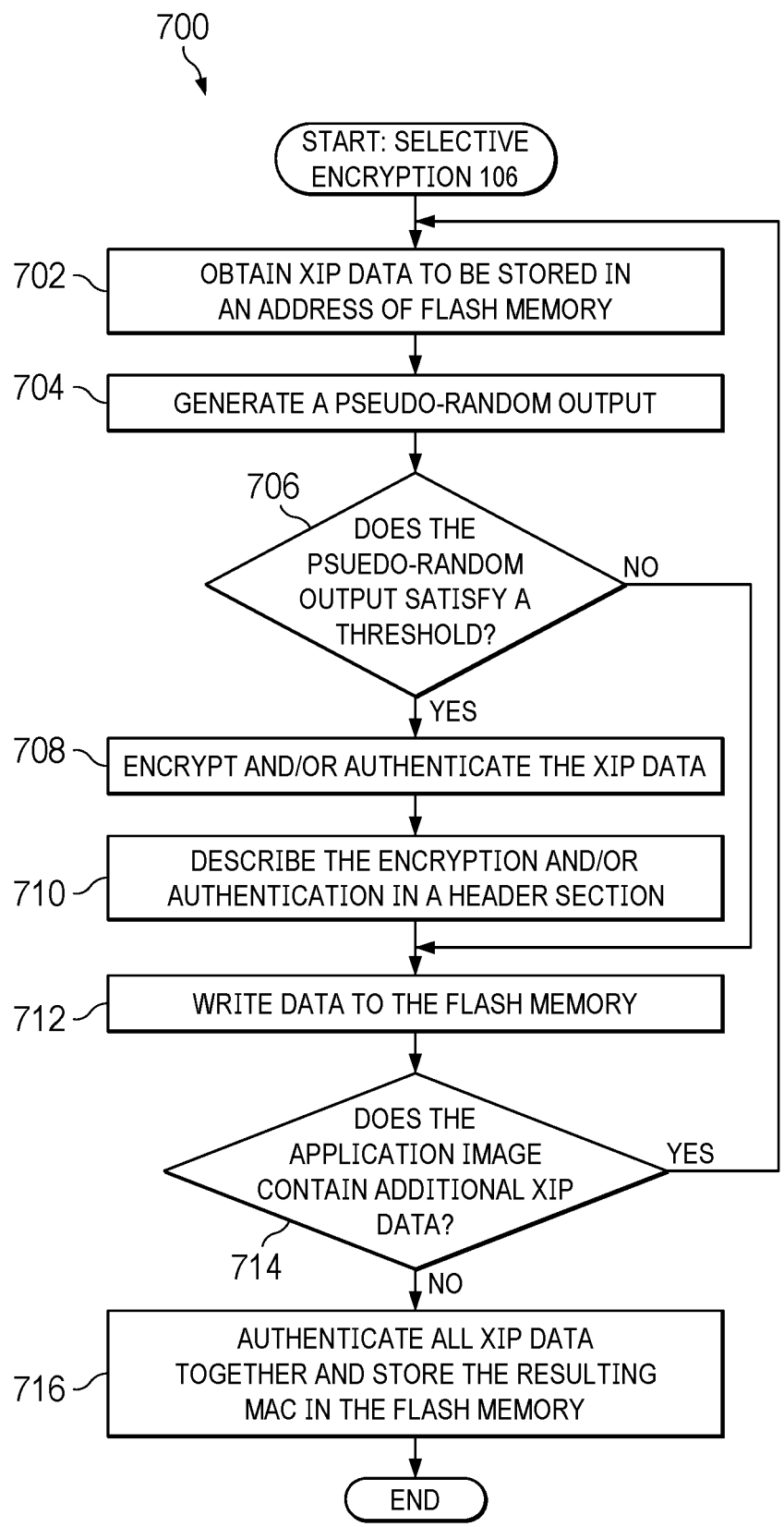
FIG. 7 is a third flowchart representative of example machine readable instructions and/or example operations that may be executed, instantiated, and/or performed using an example programmable circuitry to implement the selective encryption circuitry of FIG. 1.

FIG. 7 is a third flowchart representative of example machine readable instructions and/or example operations 700 that may be executed, instantiated, and/or performed by programmable circuitry to implement the selective encryption circuitry of FIG. 1. The example machine-readable instructions and/or the example operations 700 of FIG. 7 begin when the example selective encryption circuitry 106 obtains XIP data to be stored in an address of the flash memory 110. (Block 702). The XIP data may refer to any type of data and any amount of data, as described above in connection with block 502 of FIG. 5.

The selective encryption circuitry 106 generates a pseudo-random output. (Block 704). As used herein, a pseudo-random output refers to the result of an algorithm that uses an input seed to generate a seemingly random value. The selective encryption circuitry 106 may use any type of architecture and/or algorithm to generate pseudo-random outputs. In some examples, the selective encryption circuitry 106 uses a linear feedback shift register (LSFR) to generate the pseudo-random output.

The selective encryption circuitry 106 determines whether the pseudo-random output satisfies a threshold. (Block 706). In some examples, the threshold of block 706 is satisfied when pseudo-random output (e.g., a numerical value) is greater or equal to a pre-determined threshold value. In other examples, the threshold of block 706 by a different condition that relates to the pseudo-random output.

If the pseudo-random output does not satisfy the threshold (Block 706: No), control proceeds to block 712. Alternatively, if the pseudo-random output does satisfy the threshold (Block 706: Yes), the selective encryption circuitry 106 encrypts and/or authenticates the XIP data. (Block 708). The selective encryption circuitry 106 then implements blocks 710, 712, 714, and 716 using the same operations described above in connection with blocks 508-514 of FIG. 5. The machine-readable instructions and/or operations 700 end after block 716.

Advantageously, the selective encryption circuitry 106 can use one or more of the machine-readable instructions and/or operations 500, 600, 700 when selectively encrypting and/or authenticating the XIP portions of the application image 112. The variety of techniques used for selective security both supports a variety of use cases and minimizes the probability of a malicious actor identifying the which sections of data are less secured while in memory.

Figure 8:
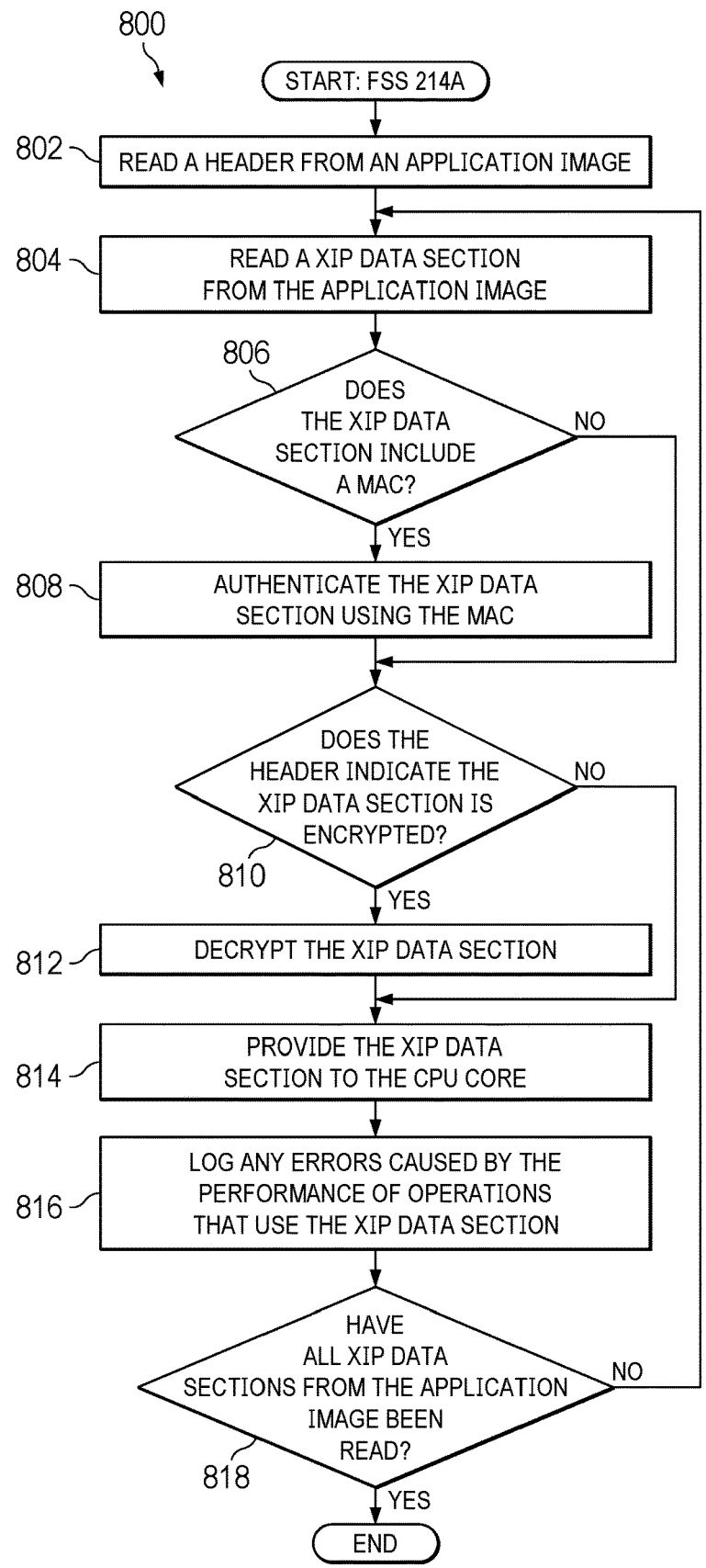
FIG. 8 is a first flowchart representative of example machine readable instructions and/or example operations that may be executed, instantiated, and/or performed using an example programmable circuitry to implement the SoC of FIG. 1.

FIG. 8 is a first flowchart representative of example machine readable instructions and/or example operations that may be executed, instantiated, and/or performed using an example programmable circuitry to implement the SoC 108 of FIG. 1. The example machine-readable instructions and/or the example operations 800 of FIG. 8 begin when the flash interface circuitry 306 reads the header section 404 of FIG. 4 from the application image 112. (Block 802). In some examples, the flash interface circuitry 306 reads a header section from a different data structure stored in the flash memory 110. The SoC 108 may provide an instruction, via the configuration interface circuitry 302, that causes the flash interface circuitry 306 to read a header section before any non XIP data sections 406 or XIP data sections 408 of a data structure.

The flash interface circuitry 306 reads an XIP data section 408A from the application image 112. (Block 804). The flash interface circuitry 306 reads the data section 408A from an address provided by the address translator circuitry 308. The address translator circuitry 308 may cause the flash interface circuitry 306 to read data from the application image 112 in any order.

The address skipper circuitry 310 determines whether the header section 404 indicates the XIP data section 408A includes a MAC for. (Block 806). If the XIP data section 408A does not include a MAC for the XIP data section 408A (Block 806: No), the address skipper circuitry 310 causes control to proceed to block 810.

If the XIP data section 408A does include a MAC for the XIP data section 408A (Block 806: Yes), the address skipper circuitry 310 causes the MAC circuitry 312 to authenticate the XIP data section 408A using the MAC of block 806. To perform authentication, the MAC circuitry 312 computes an additional MAC using the XIP data section 408A and compares the additional MAC to the MAC of block 806. The XIP data section 408A is considered authenticated (e.g., un-edited) if the two MACs are equal. If the two MACs are unequal, the FSS 214A may perform preventative actions. Preventative actions are discussed further in connection with FIG. 9.

The address skipper circuitry 310 determines whether the header section 404 indicates the XIP data section 408A is encrypted. (Block 810). The header section 404 may indicate which XIP data sections 408 are encrypted in any suitable format as described above. If the XIP data section 408A is not encrypted (Block 810: No), the address skipper circuitry 310 causes control to proceed to block 814.

If the XIP data section 408A is encrypted, the address skipper circuitry 310 causes the flash security circuitry 322 to decrypt the XIP data section 408A. (Block 812). In the example of FIG. 3, the flash security circuitry 322 causes either the AES circuitry 314 or the GCM circuitry 316 to perform the OTF decryption. In other examples, the flash security circuitry 322 uses a different type of decryption. The address skipper circuitry 310 selects the type of decryption based on the type of encryption employed by the selective encryption circuitry 106.

The order in which the FSS 214A implements blocks 806-812 depends on the order in which the selective encryption circuitry 106 selectively encrypts and authenticates data. In the example of FIG. 8, the selective encryption circuitry 106 computes a MAC after encrypting the XIP data section 408A. As a result, the flash security circuitry 322 computes a comparison MAC before decrypting the XIP data section 408A. In other examples, the selective encryption circuitry 106 computes a MAC before encrypting the XIP data section, and the flash security circuitry 322 decrypts the XIP data section before computing a comparison MAC.

The data interface circuitry 304 provides the XIP data section 408A directly to the CPU core 210. (Block 814). In the example of FIG. 8, the FSS 214A provides the XIP data section 408A to the CPU cores 210A or 210B before reading a subsequent XIP data section 408B. In other examples, the FSS 214A reads multiple XIP data sections (e.g., XIP data sections 408A, 408B, 408C), selectively decrypts and/or authenticates the read XIP data sections, and then provides the CPU cores 210A or 210B a set of XIP data sections.

The FSS 214A logs any errors caused by the performance of operations that use the XIP data section 408A. (Block 816). As described above, an error code generated by the CPU core 210, the flash interface circuitry 306, or the ECC circuitry 318 may cause the FSS 214A to store information relevant to the error in the error data buffer 320. Such information may include but is not limited to error codes generated by the CPU core 210, some or all of the XIP data that was used during the error, the address of the flash memory 110 at which the XIP data was stored, etc.

The FSS 214A determines whether all XIP data sections 408 from the application image 112 have been read. (Block 818). If all XIP data sections 408 have not been read (Block 818: No), control returns to block 804 where the flash interface circuitry 306 reads another XIP data section 408B from the application image 112. If all XIP data sections 408 have been read (Block 818: Yes), the machine-readable instructions and/or operations 800 end.

The example flowchart of FIG. 8 describes operations performed when the FSS 214A reads XIP data. In some examples, the FSS 214A also reads non-XIP data. In such examples, the data interface circuitry 304 stores the non-XIP data in the on-chip memory 208 for processing by the HSM 212 without operations performed by the address skipper circuitry 310 or flash security circuitry 322. The FSS 214A may read non-XIP data portions between iterations of blocks 804-818 or in parallel with the implementation of the flowchart of FIG. 8.

Advantageously, the FSS 214A implements the computationally expensive operations of blocks 808 and 812 less frequently than systems that encrypt and authenticate all data in external memory, thereby improving performance. The FSS 214A also implements the machine-readable instructions and/or operations 800 in real time (or in substantially real time, recognizing there may be real world delays for computing time, transmission, etc.). As a result, if the CPU core 210A and/or 210B exhibits an error, the SoC 108 can log contextual data the error in the error data buffer 320 before said data is overwritten by a subsequent read or write operation.

Figure 9:
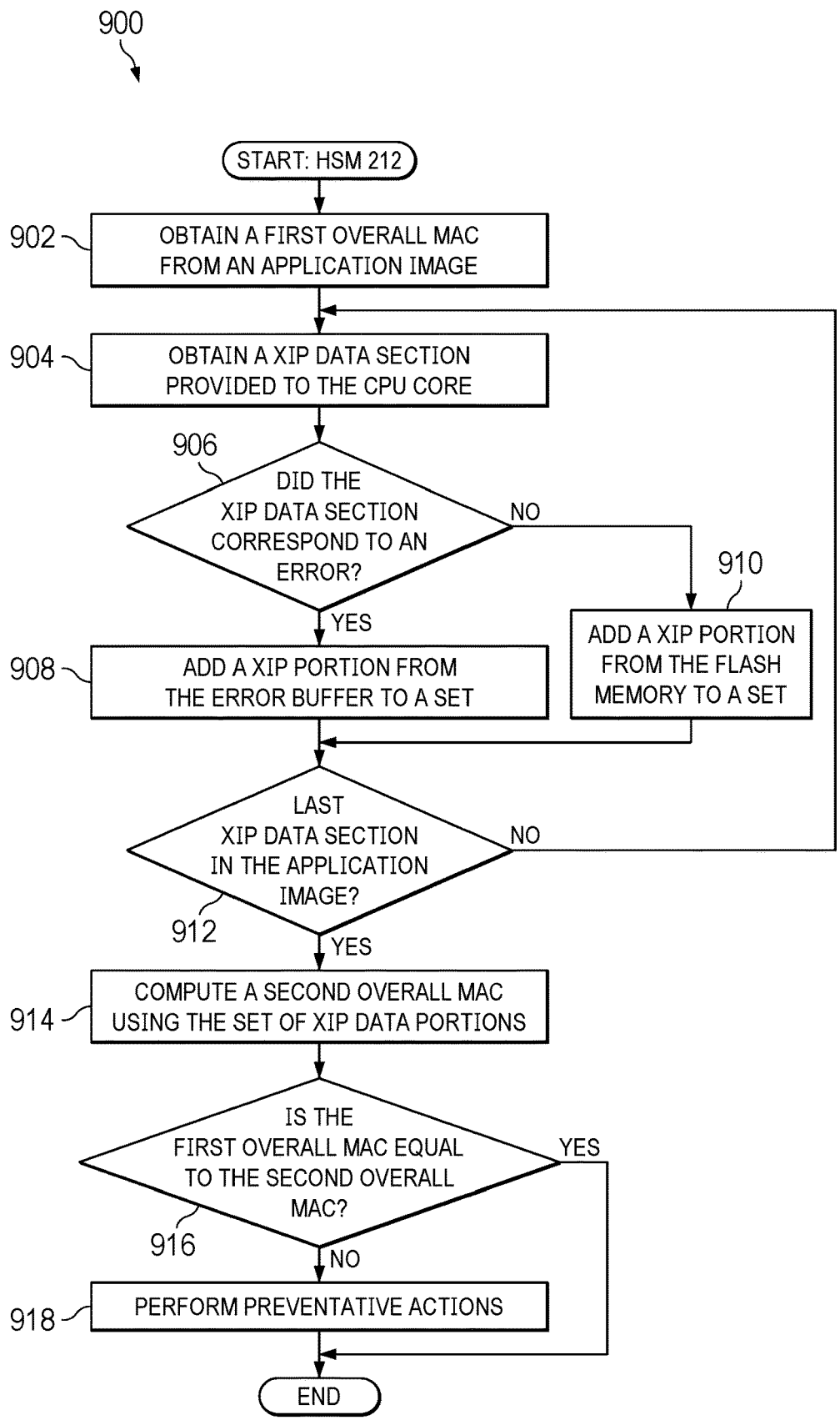
FIG. 9 is a flowchart representative of example machine readable instructions and/or example operations that may be executed, instantiated, and/or performed using an example programmable circuitry to implement the SoC of FIG. 1.

FIG. 9 is a flowchart representative of example machine readable instructions and/or example operations that may be executed, instantiated, and/or performed using an example programmable circuitry to implement the SoC 108 of FIG. 1. The example machine readable instructions and/or operations 900 refer to operations performed by the HSM 212 after the CPU core 210A and/or 210B has performed operations based on the application image 112.

The example machine readable instructions and/or operations 900 begin when the HSM 212 obtains a first overall MAC from the application image 112. (Block 902). The first overall MAC refers to a MAC produced by the selective encryption circuitry 106 using the XIP part of the application image 112 (e.g., all of the XIP data sections 408) as an input. As described above, the first overall MAC of block 902 is computed by the selective encryption circuitry 106 at one of blocks 514, 614, and 716 of FIGS. 5-7. The first overall MAC is then read by the FSS 214A as part of the header section 404 at block 802 of FIG. 8.

The HSM 212 obtains a XIP data section 408A that was provided to the CPU core. (Block 904). In some examples, when providing a XIP data section to the CPU core 210, the FSS 214A also provides a copy of said XIP data section to the HSM 212.

The HSM 212 determines whether the XIP data section 408A corresponds to an error. (Block 906). The HSM 212 performs the determination of block 906 by identifying if the CPU core, 210A CPU core 210B, or an FSS instance 214 raised an error code, interrupt, flag, etc. when performing operations that corresponded to the XIP data section 408A.

If the XIP data section 408A corresponds to an error (Block 906: Yes), the HSM 212 obtains a copy of the XIP data section 408A from the error data buffer 320. (Block 908). The HSM 212 also adds the copy obtained from the error data buffer 320 to a set of XIP data sections at block 908. In doing so, the HSM 212 ensures the set includes a copy of the XIP data section 408A exactly as it was provided to the CPU cores 210A or 210B (e.g., the copy in the set was also used when the error of block 906 occurred). In contrast, if the HSM 212 attempted to obtain a copy of the XIP data section 408A from the flash memory 110 at block 908, the set may include a different version of the XIP data section 408A if a malicious actor tampered with the flash memory 110 sometime between block 804 of FIG. 8 and block 908 of FIG. 9.

If the XIP data section 408A does not correspond to an error (Block 906: No), the HSM 212 obtains a copy of the XIP data section 408A from the flash memory 110. (Block 910). The HSM 212 also adds the copy obtained from the flash memory 110 to the set of XIP data sections at block 910. Data from flash memory 110 is obtained at block 910 because, to reduce the size of the memory in view of the space and cost constraints of the SoC 108, the error data buffer 320 does not store XIP data portions that did not cause an error. Furthermore, the fact that the XIP data portion operated as intended (e.g., was used by the CPU cores 210A or 210B without generating an error) indicates the corresponding portion of flash memory 110 has not been edited between block 804 of FIG. 8 and block 908 of FIG. 9.

After implementing either block 908 or block 910, the HSM 212 determines whether the XIP data section of block 904 is the last XIP data section in the application image 112. (Block 912). If there are additional XIP data sections in the application image 112 (Block 912: No), control returns to block 904 where the HSM 212 obtains another XIP data section 408B provided to the CPU core 210.

If the XIP data section of block 904 is the last XIP data section in the application image 112 (Block 912: Yes), the HSM 212 computes a second overall MAC using the set of XIP data portions. (Block 914). That is, the HSM 212 executes an authentication algorithm using the set of XIP data portions (which is populated by multiple iterations of blocks 908 and 910) as an input to produce the second overall MAC.

The HSM 212 determines whether the first overall MAC is equal to the second overall MAC. (Block 916). If the first overall MAC and the second overall MAC are unequal (Block 916: No), then the contents of the flash memory 110 have been edited and tampering has occurred. Accordingly, in such examples, the HSM 212 performs one or more preventative actions. (Block 918). Preventative actions refer to any action that mitigates potential harm caused from the tampering. Preventative actions may include but are not limited to stopping the execution of a particular program, process, or thread, powering off one or more components of the SoC 108, setting an interrupt, raising a flag, or generally alerting an operating system, etc. If the first overall MAC and the second overall MAC are equal (Block 916: Yes), no editing has occurred to the application image 112 while in flash memory 110. The machine-readable instructions and/or operations 900 end after either block 916 or block 918.

In the example of FIG. 9, the HSM 212 computes the second overall MAC after each XIP data section 408 in the application image 112 is provided. In other examples, the HSM 212 computes the MAC one or more times while the FSS 214A is still reading XIP data from the application image 112. In such other examples, the set of XIP data sections used to calculate the second overall MAC uses data from the flash memory 110 for any section that has not yet been provided to the CPU core 210. In such other examples, the HSM 212 may compute copies of the second overall MAC (and compare said copy to the first overall MAC) less frequently than the FSS 214A performs the machine-readable instructions and/or operations 800.

Figure 10:
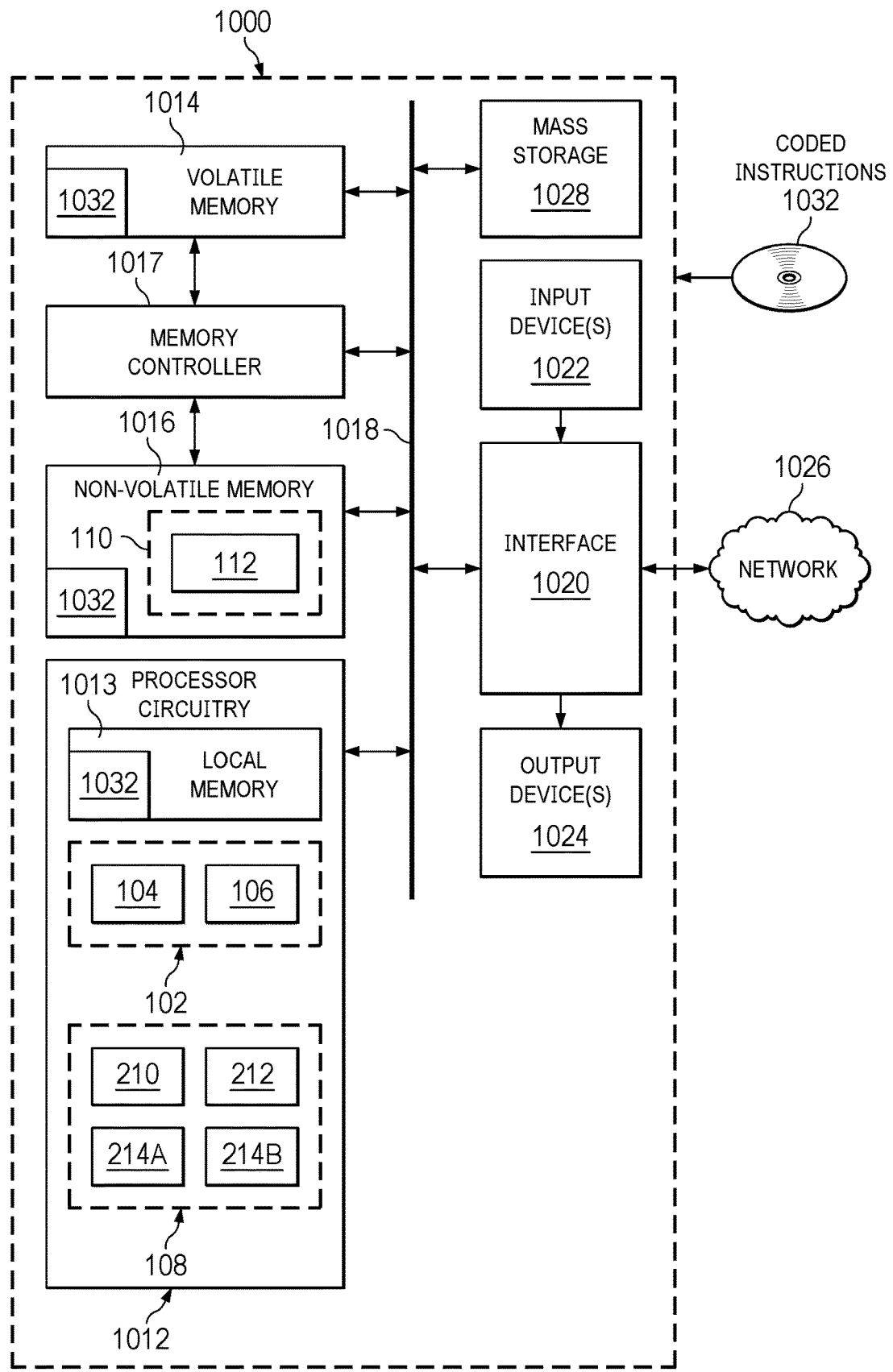
FIG. 10 is a block diagram of an example processing platform including programmable circuitry structured to execute, instantiate, and/or perform the example machine readable instructions and/or perform the example operations of FIGS. 5-9 to implement the compute device and the SoC of FIGS. 1-3.

FIG. 10 is a block diagram of an example programmable circuitry platform 1000 structured to execute and/or instantiate the example machine-readable instructions and/or the example operations of FIGS. 5-9 to implement the compute device 102 and SoC 108 of FIGS. 1-3. The programmable circuitry platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the flash generation application 104, the selective encryption circuitry 106, the CPU core 210, the HSM 212, the FSS instances 214, and, more generally, the compute device 102 and the SoC 108.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016. In this example, the non-volatile memory 1016 stores the application image 112, and more generally, implements the flash memory 110.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIGS. 5-9, may be stored in the mass storage device 1028, in the volatile memory 1014, in the non-volatile memory 1016, and/or on at least one non-transitory computer readable storage medium such as a CD or DVD which may be removable.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Numerical identifiers such as "first", "second", "third", etc. are used merely to distinguish between elements of substantially the same type in terms of structure and/or function. These identifiers used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Unless otherwise stated, "about," "approximately," or "substantially" preceding a value means +/-10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that selectively encrypt and authenticate XIP memory. Described systems, apparatus, articles of manufacture, and methods improve the efficiency of using a computing device determining whether to encrypt and/or authenticate based on a predefined sequence, the information stored in the data, and/or a pseudorandom algorithm. The subset of XIP data sections with encryption and the subset of XIP data sections with authentication are described in a header, allowing a SoC to improve performance by only decrypting and authenticating the indicated subsets. If a processor core exhibits an error, the SoC stores contextual data in an error data buffer in real time. The error data buffer enables the SoC to compute an additional MAC for the entire data structure stored in flash memory, thereby detecting tampering and mitigating against the use of unencrypted or un-authenticated XIP data as an attack surface. Described systems, apparatus, articles of manufacture, and methods are accordingly directed to one or more improvement(s) in the operation of a machine such as a computer or other electronic and/or mechanical device.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   interface circuitry; and programmable circuitry configured to:
  obtain a set of processor instructions;
  select a first subset of processor instructions from the set, the first subset of processor instructions to exclude open-source code present within the set of processor instructions;
  encrypt the first subset of processor instructions;
  select a second subset of processor instructions from the set;
  compute a plurality of message authentication codes (MACs) corresponding to the second subset of processor instructions;
  cause the interface circuitry to write the set of processor instructions to an external memory; and
  cause the interface circuitry to write a description of the first subset of processor instructions, a description of the second subset of processor instructions, and the plurality of MACs to the external memory.

2. The apparatus of claim 1, wherein the programmable circuitry is configured to select between the first subset of processor instructions and the second subset of processor instructions for encryption based on a pre-defined sequence.

3. The apparatus of claim 1, wherein:
  the programmable circuitry is configured to obtain the set of processor instructions from an application; and
  the application indicates a third subset of processor instructions in the set corresponds to open-source code.

4. The apparatus of claim 3, wherein the programmable circuitry is configured to select the second subset of processor instructions such that the plurality of MACs do not include a MAC that corresponds to open-source code.

5. The apparatus of claim 1, wherein the programmable circuitry is configured to select between the first subset of processor instructions and the second subset of processor instructions for encryption based on a pseudo-random output.

6. The apparatus of claim 5, wherein the programmable circuitry uses a linear feedback shift register to generate the pseudo-random output.

7. The apparatus of claim 1, wherein the programmable circuitry is configured to:
  compute a MAC in the plurality of MACs using a processor instruction within the set as an input;
  compute an additional MAC using the set of processor instructions as an input; and
  write the additional MAC to the external memory.

8. An apparatus comprising:
  a processor core;
  an on-chip memory; and
  a flash sub-system configured to:
    obtain a set of processor instructions from an external memory;
    obtain a description of a first subset within the set of processor instructions from the external memory, the first subset of processor instructions to exclude open-source code present within the set of processor instructions;
    decrypt the first subset of processor instructions based on the description of the first subset;
    obtain a description of a second subset within the set of processor instructions from the external memory;
    determine whether to authenticate the second subset of processor instructions using a corresponding plurality of message authentication codes (MACs) based on the description of the second subset; and
    provide the set of processor instructions to the processor core without intermediate storage of the processor instructions in the on-chip memory.

9. The apparatus of claim 8, wherein the processor core is configured to perform an operation using a processor instruction from the set.

10. The apparatus of claim 9, wherein:
  the flash sub-system includes an error data buffer; and
  in response to the performance of the operation causing an error, the flash sub-system is configured to:
    store the processor instruction in the error data buffer; and
    store an address of the external memory that corresponds to the processor instruction in the error data buffer.

11. The apparatus of claim 10, wherein the flash sub-system is configured to store the processor instruction and the address in the error data buffer during run time.

12. The apparatus of claim 10, wherein:
  the set of processor instructions collectively form an execute in place (XIP) part of an application image;
  the apparatus further includes a hardware security module configured to:
    obtain a first MAC from the external memory, the first MAC computed using the XIP part of the application image as an input, the first MAC computed before the processor instructions were stored in the external memory;
    compute a second MAC using the processor instruction stored in the error data buffer and processor instructions from the external memory that did not cause an error as inputs; and
    compare the first MAC to the second MAC.

13. The apparatus of claim 12, wherein the hardware security module is configured to perform one or more preventative actions in response to the first MAC and the second MAC being unequal.

14. A non-transitory machine-readable storage medium comprising instructions to cause programmable circuitry to at least:
  obtain a set of processor instructions;
  select a first subset of processor instructions from the set;
  encrypt the first subset of processor instructions;
  select a second subset of processor instructions from the set, the second subset of processor instructions to exclude open-source code present within the set of processor instructions;
  compute a plurality of message authentication codes (MACs) corresponding to the second subset of processor instructions;
  write the set of processor instructions to an external memory; and
  write a description of the first subset of processor instructions, a description of the second subset of processor instructions, and the plurality of MACs to the external memory.

15. The non-transitory machine-readable storage medium of claim 14, wherein the programmable circuitry is configured to select between the first subset of processor instructions and the second subset of processor instructions for encryption based on a pre-defined sequence.

16. The non-transitory machine-readable storage medium of claim 14, wherein:
  the programmable circuitry is configured to obtain the set of processor instructions from an application; and
  the application indicates a third subset of processor instructions in the set corresponds to open-source code.

17. The non-transitory machine-readable storage medium of claim 16, wherein the programmable circuitry is configured to select the first subset of processor instructions such that the open-source code is not encrypted.

18. The non-transitory machine-readable storage medium of claim 14, wherein the programmable circuitry is configured to select between the first subset of processor instructions and the second subset of processor instructions for encryption based on a pseudo-random output.

19. The non-transitory machine-readable storage medium of claim 18, wherein the programmable circuitry is configured to use a linear feedback shift register to generate the pseudo-random output.

20. The non-transitory machine-readable storage medium of claim 14, wherein the programmable circuitry is configured to:
   compute a MAC in the plurality of MACs using a processor instruction within the set as an input;
   compute an additional MAC using the set of processor instructions as an input; and
   write the additional MAC to the external memory.

\* \* \* \* \*